United States Patent [19]

Kuramoto et al.

[11] 4,191,272

[45] Mar. 4, 1980

[54] DUST SEAL

[75] Inventors: Akio Kuramoto, Okazaki; Takeo Kawai, Toyota, both of Japan

[73] Assignee: Toyota Jidosha Kogyo Kabushiki Kaisha, Toyota, Japan

[21] Appl. No.: 958,365

[22] Filed: Nov. 7, 1978

[30] Foreign Application Priority Data

May 24, 1978 [JP] Japan .............................. 53-71031[U]

[51] Int. Cl.² ...................... B62D 25/16; F02B 77/00
[52] U.S. Cl. .................................. 180/84; 123/195 C;
123/198 E; 180/54 A; 277/166; 277/207 R
[58] Field of Search ...................... 180/64 R, 54 A, 84;
280/152 R; 123/195 C, 198 E; 277/12, 178, 207
R, 166, 182, 183, 184, 185, 186, DIG. 4

[56] References Cited

U.S. PATENT DOCUMENTS

| 2,834,419 | 5/1958 | Sebok | 180/54 A |
| 3,302,740 | 2/1967 | Giacosa | 180/64 R |
| 3,481,119 | 12/1969 | McKinlay | 180/54 A |
| 4,080,945 | 3/1978 | Hikosaka | 123/195 C |

*Primary Examiner*—Joseph F. Peters, Jr.
*Assistant Examiner*—Randall A. Schrecengost
*Attorney, Agent, or Firm*—Oblon, Fisher, Spivak, McClelland & Maier

[57] ABSTRACT

Disclosed is a dust seal used in a front engine - front drive vehicle, wherein the clutch housing portion of a trans-axle case is mounted to the rear end of an engine body through a rear end plate and the differential housing portion of the trans-axle case is arranged below the engine body with a space therebetween. The seal is made of a plate of elastic material and is mounted to a bottom edge of the rear end plate to seal an upper surface of the differential housing portion and cover the front portion of side walls of the clutch housing portion.

5 Claims, 4 Drawing Figures

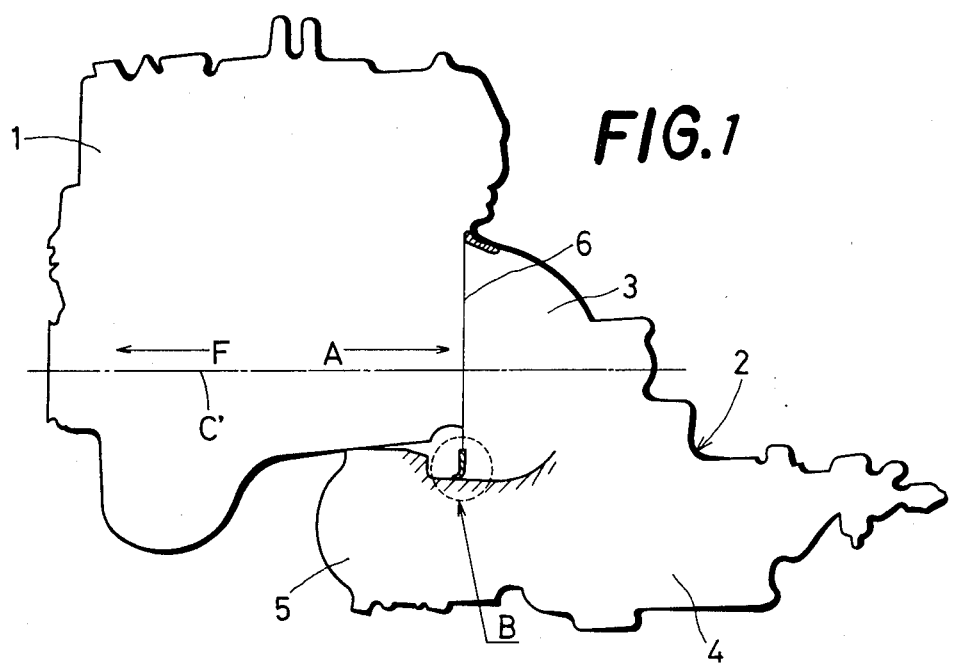
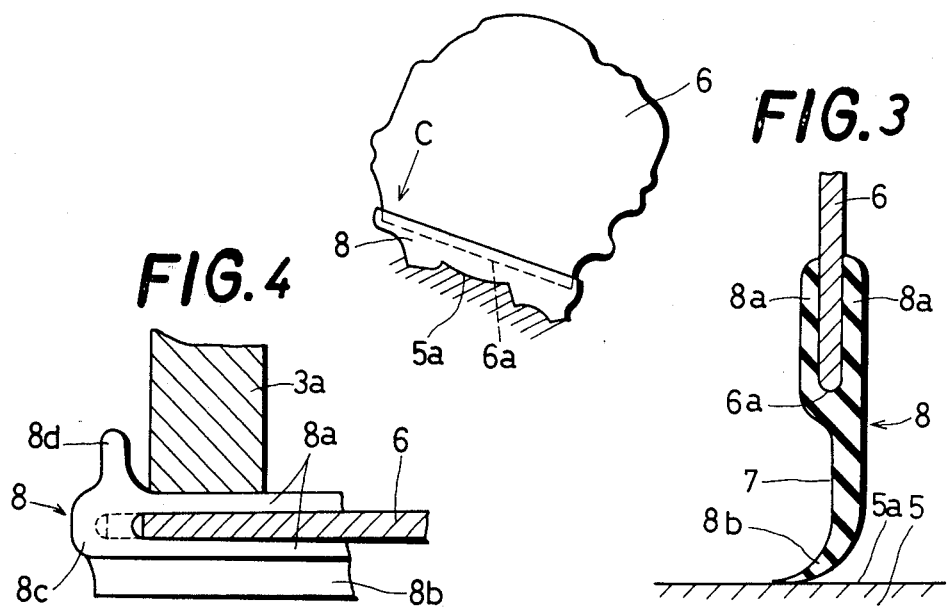
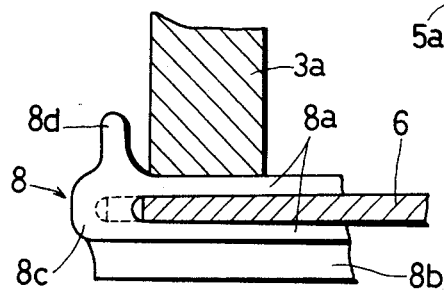
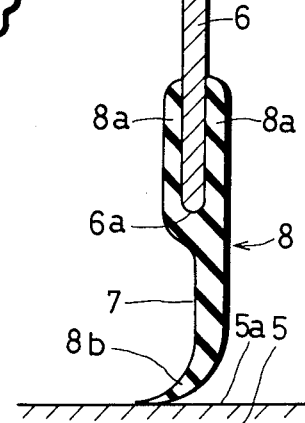

DUST SEAL

In a conventional front engine-front drive vehicle, an oil pan, a clutch, a transmission and a differential portions for an engine of the vehicle are accommodated in a trans-axle case and the transmission and the differential portions are arranged below the engine. When the transmission or the differential portion is arranged in a different position relative to the engine in comparison with the conventional arrangement, a means should be provided for easily mounting and removing the trans-axle case on and from the engine body to prevent muddy water and dust from entering the clutch housing portion of the trans-axle case accommodating the clutch.

In a front engine-front drive vehicle, in which a differential housing portion of a trans-axle case is arranged below an engine body with a space therebetween and a clutch housing portion of the trans-axle case is connected with the rear portion of the engine body through a rear engine plate, it is an object of this invention to provide a dust seal which can effectively compensate the dimensional deviations of the rear end plate, the complicated shape and dimensional deviations of the clutch housing necessitating a square seal and the dimensional deviations of the clutch housing, when the engine body is connected with the trans-axle case.

It is another object of this invention to provide a dust seal which may prevent muddy water and dust from entering the clutch housing portion during the running of the vehicle.

The invention will now be described in further detail by way of example with reference to the accompanying drawings, in which:

FIG. 1 is a schematic side elevation of this invention;

FIG. 2 is a cross sectional view of a part of FIG. 1 shown from the direction of an arrow A;

FIG. 3 is a detail plan of a part B in FIG. 1; and

FIG. 4 is a plan view of a part of FIG. 2 shown from the direction of an arrow C.

In FIG. 1, an engine body 1 for a front engine-front drive vehicle is shown, in which an arrow F shows the front of the engine and a pointed chain line C' an axis center line of a crank. A trans-axle case 2 comprises a clutch housing portion 3 accommodating a clutch, a transmission housing portion 4 accommodating a transmission and a differential housing portion 5 accommodating a differential. The trans-axle case 2 is connected to the engine body 1 at the rear end thereof and the front end of the clutch housing portion 3 is secured to the rear end of said engine body 1 through a rear end plate 6 made of iron. In this situation, the upper surface of the differential housing portion 5 is located below the engine body 1 with a narrow space therebetween. As viewed from the front end of the engine body 1, the rear end plate 6 is positioned substantially in the center of the engine body 1 and has a rectilinear bottom edge 6a. The upper surface 5a of the differential housing portion 5 is uneven and a space 7 is formed between the bottom edge 6a and the upper surface 5a.

The lower portion of the end plate 6 is inserted between bifurcated upper portions 8a of a laminar dust seal 8 made of an elastic material, such as rubber, and fixed thereto by an adhesive. The lower portion of the dust seal 8 is formed into a lip portion 8b in the shape of a knife edge, which contacts the upper surface 5a of the differential housing portion 5 and is curved forwardly or towards the front end of the engine body 1. The lip portion 8b closely contacts the uneven upper surface 5a of the differential housing portion 5 to seal said upper surface 5a as shown in FIG. 2. Further, as shown in FIG. 4, either side edge 8c of the dust seal 8 (in FIG. 4, only one edge 8c is illustrated) has a side lip 8d extending rearwards or towards the back end of the engine body 1.

According to the present invention, therefore, the dimensional deviations of the rear end plate, the complicated shape of the clutch housing and the dimensional deviations thereof may easily be compensated when the engine body and the trans-axle case are combined together. Further, during the running of the vehicle muddy water and dust are prevented from entering the clutch housing.

What is claimed is:

1. In a front engine-front drive vehicle having a trans-axle case comprising a clutch housing portion accommodating a clutch and a differential housing portion accommodating a differential and connected to an engine body on the vehicle, said clutch housing portion being mounted to the engine body at the rear end thereof through a rear end plate having a bottom edge and said differential housing portion being arranged below said engine body with a space therebetween, a laminar dust seal of an elastic material attached to said bottom edge of said rear end plate, said seal having a means to seal an upper surface of said differential housing portion at the lower portion thereof and a means to cover a front portion of side walls of said clutch housing portion on either side thereof.

2. An invention as set forth in claim 1, wherein said dust seal is made of rubber.

3. An invention as set forth in claim 2, wherein said dust seal is bifurcated at the upper portion thereof and the bottom edge of said rear end plate is inserted between said bifurcated portions to be secured therebetween.

4. An invention as set forth in claim 2, wherein said seal means includes a forwardly curved lower lip portion contacting the upper surface of the differential housing portion and having the shape of a knife edge in cross-section.

5. An invention as set forth in claim 2, wherein said cover means is composed of side lips extending rearwards from either side of said dust seal.

* * * * *